US012768386B2

(12) United States Patent
Rydsjö et al.

(10) Patent No.: US 12,768,386 B2
(45) Date of Patent: Oct. 20, 2026

(54) MOUNTING BRACKET

(71) Applicant: Välinge Innovation AB, Viken (SE)

(72) Inventors: Oscar Rydsjö, Halmstad (SE); Marko Sostar, Helsingborg (SE); Patrik Carlsson, Hägersten (SE)

(73) Assignee: VÄLINGE INNOVATION AB, Viken (SE)

( * ) Notice: Subject to any disclaimer, the term of this patent is extended or adjusted under 35 U.S.C. 154(b) by 78 days.

(21) Appl. No.: 19/048,028

(22) Filed: Feb. 7, 2025

(65) Prior Publication Data

US 2025/0180052 A1 Jun. 5, 2025

Related U.S. Application Data

(63) Continuation of application No. 17/665,160, filed on Feb. 4, 2022, now Pat. No. 12,247,598.

(30) Foreign Application Priority Data

Feb. 8, 2021 (SE) .................................. 2150138-2

(51) Int. Cl.
*F16B 12/10* (2006.01)
*A47B 91/00* (2006.01)

(52) U.S. Cl.
CPC ............. *F16B 12/10* (2013.01); *A47B 91/00* (2013.01)

(58) Field of Classification Search
CPC ......... F16B 12/10; F16M 11/00; F16M 13/00; A47B 91/00; A47B 97/00
USPC ..................................................... 248/222.13
See application file for complete search history.

(56) References Cited

U.S. PATENT DOCUMENTS

| | | | | |
|---|---|---|---|---|
| 1,783,150 A * | 11/1930 | Jeffery | E05C 3/042 | 292/213 |
| 4,611,841 A * | 9/1986 | Ravinet | A47B 95/00 | 292/241 |
| 4,695,030 A | 9/1987 | Fischer | | |
| 5,092,723 A * | 3/1992 | Compton | B21K 25/00 | 411/166 |
| 5,289,621 A | 3/1994 | Kaneko | | |
| 6,238,129 B1 | 5/2001 | Rahn | | |

(Continued)

FOREIGN PATENT DOCUMENTS

| | | |
|---|---|---|
| CN | 110678661 A | 1/2020 |
| WO | 2014/072080 A1 | 5/2014 |
| WO | 2019/125291 A1 | 6/2019 |

OTHER PUBLICATIONS

U.S. Appl. No. 19/226,620, Henrik Lindquist, filed Jun. 3, 2025.

(Continued)

*Primary Examiner* — Monica E Millner
(74) *Attorney, Agent, or Firm* — Boone IP Law

(57) ABSTRACT

A mounting bracket for connecting two objects to one another. The mounting bracket includes an elongate protruding tongue element configured to be inserted in a cylindrical recess in one of the objects. The tongue element has one recess contacting side. A cross section of the tongue element on the recess contacting side is a circle sector, the other side of the tongue element being adapted to engage with a locking device. The locking device includes a cylinder and a lever connected to the cylinder. The cylinder is configured to be arranged in the recess. The cylinder is configured to act as a cam when the cylinder is turned about its axis in the recess using the lever.

18 Claims, 14 Drawing Sheets

(56) References Cited

U.S. PATENT DOCUMENTS

| | | | |
|---|---|---|---|
| 7,717,278 | B2 | 5/2010 | Kao |
| 8,220,217 | B2 | 7/2012 | Muehlebach |
| 8,887,468 | B2 | 11/2014 | Hakansson et al. |
| 9,375,085 | B2 | 6/2016 | Derelv |
| 9,538,842 | B2 | 1/2017 | Hkansson et al. |
| 9,655,442 | B2 | 5/2017 | Boo et al. |
| 9,714,672 | B2 | 7/2017 | Derelv |
| 9,723,923 | B2 | 8/2017 | Derelv |
| 9,726,210 | B2 | 8/2017 | Derelv et al. |
| 9,781,997 | B2 | 10/2017 | Maertens et al. |
| 9,945,121 | B2 | 4/2018 | Derelv |
| 10,034,541 | B2 | 7/2018 | Boo et al. |
| 10,202,996 | B2 | 2/2019 | Hkansson et al. |
| 10,415,613 | B2 | 9/2019 | Boo |
| 10,448,739 | B2 | 10/2019 | Derelov et al. |
| 10,451,097 | B2 | 10/2019 | Brnnstrm et al. |
| 10,486,245 | B2 | 11/2019 | Fridlund |
| 10,506,875 | B2 | 12/2019 | Boo et al. |
| 10,544,818 | B2 | 1/2020 | Fridlund |
| 10,548,397 | B2 | 2/2020 | Derelv et al. |
| 10,669,716 | B2 | 6/2020 | Derelv |
| 10,670,064 | B2 | 6/2020 | Derelv |
| 10,724,564 | B2 | 7/2020 | Derelv |
| 10,731,688 | B2 | 8/2020 | Brnnstrm et al. |
| 10,736,416 | B2 | 8/2020 | Derelv et al. |
| 10,830,266 | B2 | 11/2020 | Fridlund |
| 10,830,268 | B2 | 11/2020 | Boo |
| 10,844,892 | B2 * | 11/2020 | Mätzler .................. F16B 13/06 |
| 10,871,179 | B2 | 12/2020 | Hkansson et al. |
| 10,876,562 | B2 | 12/2020 | Pervan |
| 10,876,563 | B2 | 12/2020 | Derelv et al. |
| 10,968,936 | B2 * | 4/2021 | Boo .................... A47B 96/201 |
| 11,076,691 | B2 | 8/2021 | Boo |
| 11,083,287 | B2 | 8/2021 | Boo et al. |
| 11,085,474 | B2 * | 8/2021 | Davis ...................... F16B 12/22 |
| 11,098,484 | B2 | 8/2021 | Derelov |
| 11,137,007 | B2 | 10/2021 | Fridlund |
| 11,204,051 | B2 | 12/2021 | Brnnstrm et al. |
| 11,246,415 | B2 | 2/2022 | Derelov et al. |
| 11,272,783 | B2 | 3/2022 | Derelv |
| 11,326,636 | B2 | 5/2022 | Pervan |
| 12,247,598 | B2 * | 3/2025 | Rydsjö .................... F16B 12/10 |
| 12,313,106 | B2 * | 5/2025 | Maertens ............. A47B 47/042 |
| 2009/0308014 | A1 | 12/2009 | Muehlebach |
| 2010/0202852 | A1 | 8/2010 | Krause et al. |
| 2012/0279161 | A1 | 11/2012 | Hakansson et al. |
| 2015/0035422 | A1 | 2/2015 | Hakansson et al. |
| 2015/0078807 | A1 | 3/2015 | Brnnstrm et al. |
| 2015/0078819 | A1 | 3/2015 | Derelv et al. |
| 2015/0196118 | A1 | 7/2015 | Derelv |
| 2015/0198191 | A1 | 7/2015 | Boo |
| 2016/0007751 | A1 | 1/2016 | Derelv |
| 2016/0174704 | A1 | 6/2016 | Boo et al. |
| 2016/0270531 | A1 | 9/2016 | Derelv |
| 2017/0079433 | A1 | 3/2017 | Derelov et al. |
| 2017/0089379 | A1 | 3/2017 | Pervan |
| 2017/0097033 | A1 | 4/2017 | Hakansson et al. |
| 2017/0159291 | A1 | 6/2017 | Derelv |
| 2017/0208938 | A1 | 7/2017 | Derelv et al. |
| 2017/0227031 | A1 | 8/2017 | Boo |
| 2017/0227032 | A1 | 8/2017 | Fridlund |
| 2017/0227035 | A1 | 8/2017 | Fridlund |
| 2017/0234346 | A1 | 8/2017 | Fridlund |
| 2017/0298973 | A1 | 10/2017 | Derelv |
| 2017/0360193 | A1 | 12/2017 | Boo et al. |
| 2018/0080488 | A1 | 3/2018 | Derelv |
| 2018/0087552 | A1 | 3/2018 | Derelv et al. |
| 2018/0112695 | A1 | 4/2018 | Boo et al. |
| 2018/0119717 | A1 | 5/2018 | Derelv |
| 2018/0202160 | A1 | 7/2018 | Derelv |
| 2018/0283430 | A1 | 10/2018 | Leistert |
| 2018/0328396 | A1 | 11/2018 | Fransson et al. |
| 2018/0368575 | A1 | 12/2018 | Dalstam et al. |
| 2019/0085886 | A1 | 3/2019 | Davis et al. |
| 2019/0113061 | A1 | 4/2019 | Hakansson et al. |
| 2019/0166989 | A1 | 6/2019 | Boo et al. |
| 2019/0191870 | A1 | 6/2019 | Derelv |
| 2019/0195256 | A1 * | 6/2019 | Derelöv .............. F16B 12/2027 |
| 2019/0195258 | A1 | 6/2019 | Zimmer et al. |
| 2019/0289999 | A1 | 9/2019 | Derelv et al. |
| 2019/0320793 | A1 | 10/2019 | Boo |
| 2019/0323532 | A1 | 10/2019 | Boo |
| 2019/0323533 | A1 | 10/2019 | Boo |
| 2019/0323534 | A1 | 10/2019 | Derelv |
| 2019/0323535 | A1 | 10/2019 | Derelv |
| 2020/0003242 | A1 | 1/2020 | Brnnstrm et al. |
| 2020/0055126 | A1 | 2/2020 | Fridlund |
| 2020/0069048 | A1 | 3/2020 | Derelv et al. |
| 2020/0069049 | A1 | 3/2020 | Derelv et al. |
| 2020/0102978 | A1 | 4/2020 | Fridlund |
| 2020/0121076 | A1 | 4/2020 | Derelov et al. |
| 2020/0146447 | A1 | 5/2020 | Brendel et al. |
| 2020/0214447 | A1 | 7/2020 | Derelov et al. |
| 2020/0300284 | A1 | 9/2020 | Pervan |
| 2020/0337455 | A1 | 10/2020 | Boo et al. |
| 2020/0340513 | A1 | 10/2020 | Derelv |
| 2021/0079650 | A1 | 3/2021 | Derelov |
| 2021/0148392 | A1 | 5/2021 | Brnnstrm et al. |
| 2021/0180630 | A1 | 6/2021 | Bruno et al. |
| 2021/0190112 | A1 | 6/2021 | Derelv |
| 2021/0207635 | A1 | 7/2021 | Hkansson et al. |
| 2021/0222716 | A1 | 7/2021 | Derelv et al. |
| 2021/0262507 | A1 | 8/2021 | Svensson et al. |
| 2021/0262508 | A1 | 8/2021 | Svensson et al. |
| 2021/0276108 | A1 | 9/2021 | Derelv et al. |
| 2021/0285480 | A1 | 9/2021 | Derelv et al. |
| 2021/0381251 | A1 | 12/2021 | Svensson |
| 2022/0018373 | A1 | 1/2022 | Boo |
| 2022/0049735 | A1 | 2/2022 | Meijer |
| 2022/0186761 | A1 | 6/2022 | Derelv et al. |

OTHER PUBLICATIONS

U.S. Appl. No. 17/870,215, Peter Derelöv, filed Jul. 21, 2022.
U.S. Appl. No. 18/191,404, Thomas Meijer, filed Mar. 28, 2023.
U.S. Appl. No. 18/239,924, Niclas Håkansson, filed Aug. 30, 2023.
U.S. Appl. No. 18/422,368, Christian Boo, filed Jan. 25, 2024.
U.S. Appl. No. 18/422,425, Christian Boo, filed Jan. 25, 2024.
U.S. Appl. No. 18/440,330, Thomas Meijer, filed Feb. 13, 2024.
U.S. Appl. No. 18/441,480, Peter Derelöv, filed Feb. 14, 2024.
U.S. Appl. No. 18/766,880, Thomas Meijer, filed Jul. 9, 2024.
U.S. Appl. No. 19/068,325, Oscar Rydsjö, filed Mar. 3, 2025.
Extended European Search Report received for European Application No. 22750119.4, mailed on Nov. 25, 2024, 6 pages.
International Preliminary Report on Patentability received for PCT Patent Application No. PCT/SE2022/050124, mailed on Aug. 17, 2023, 7 pages.
International Search Report and Written Opinion received for PCT Patent Application No. PCT/SE2022/050124, mailed on Apr. 13, 2022, 9 pages.
U.S. Appl. No. 19/184,232, Thomas Meijer, filed Apr. 21, 2025.

* cited by examiner

MOUNTING BRACKET

CROSS REFERENCE TO RELATED APPLICATIONS

The present application is a continuation of U.S. application Ser. No. 17/665,160, filed on Feb. 4, 2022, which claims the benefit of Swedish Application No. 2150138-2, filed on Feb. 8, 2021. The entire contents of each of U.S. application Ser. No. 17/665,160 and Swedish Application No. 2150138-2 are hereby incorporated herein by reference in their entirety.

TECHNICAL FIELD

This disclosure pertains, in general, to the field of assembling. More particularly the disclosure relates to a mounting bracket for connecting two objects to one another, the mounting bracket comprising a first mounting part arranged to be connected to one of the objects and a second mounting part arranged to be connected to the other object. Further, the disclosure relates to a furniture fitting assembling using such a mounting bracket and also to a method of assembling to objects using such a mounting bracket and a locking device.

BACKGROUND

Assembling two or more objects into one piece, for instance furniture, has historically required tools such as drills, screwdrivers, hammers, and wrenches.

Starting with click floors, assembling not requiring tools has further been developed and more or less all types of furniture in a household could be assembled without tools or at least with a minimum of tools.

WO 2014/072080 discloses a furniture product provided with a mechanical locking device. The furniture product further comprises a first panel connected perpendicular to a second panel by the mechanical locking device that comprises a flexible tongue in an insertion groove and a pin that is inserted into the mechanical locking device to move the flexible tongue.

In WO 2019/125291 the need to provide an easier assembling and/or increased locking strength of the panels is addressed. Provided is a method, a locking device, and a set of panels, preferably for a furniture product, including a panel and an adjacent panel. The panel includes a groove and at least one hole connected to the groove via an opening. The adjacent panel includes a first edge that is configured to be arranged in the groove of the panel, and the panel includes a locking device configured to lock the first edge of the adjacent panel in the groove of the panel. The locking device includes a cylinder and a lever connected to the cylinder and the cylinder is configured to be arranged in the hole in the panel. The cylinder is an eccentric cylinder including a top and bottom base and a locking surface connecting the top and bottom base wherein the cylinder is configured to act as a cam when the cylinder is turned about an axis in the hole. The lever is configured to, when turned, turn the cylinder about the axis between a mounting position and a locking position. In the mounting position the first edge of the adjacent panel is free to be arranged in the groove of the panel and in the locking position a part of the locking surface of the locking device extend into the groove through the opening and lock the adjacent panel in the groove.

SUMMARY

Accordingly, embodiments of the present disclosure preferably seek to further provide alternative mounting solutions that require a minimum of tools by providing a mounting bracket, a furniture fitting assembly, and a method of assembly.

According to one aspect of the present disclosure, a mounting bracket for connecting two objects to one another is provided. The mounting bracket comprises a first mounting part arranged to be connected to one of the objects and a second mounting part arranged to be connected to the other object.

At least one of the mounting parts comprises an elongate protruding tongue element arranged to be inserted in a cylindrical recess in one of the objects. The tongue element has one recess contacting side such that the cross section of the tongue element on the recess contacting side is a circle sector with a radius corresponding to the radius of the cylindrical recess. The other side of the tongue element is adapted to engage with a locking device.

The radius of the circle sector may be the same as or within 10% smaller than the radius of the cylindrical recess.

The locking device comprises a cylinder and a lever connected to the cylinder; the cylinder being configured to be arranged in the recess adjacent said tongue. The cylinder is an eccentric cylinder comprising a top and bottom base and a locking surface connecting the top and bottom base. The cylinder is further configured to act as a cam when the cylinder is turned about its axis in the recess using the lever such that the cylinder is turned from a mounting position to a locking position in which a part of the locking surface pushes the tongue element such that said recess contacting side of the tongue element is in a pressing fit against the side of the recess.

Thus, the bracket with the tongue element can be attached to an object with a cylindrical recess by using the locking device that is turned from a mounting position to a locking position. The side of the tongue element that is adapted to be in contact with the locking device could have various shapes such as concave, convex, and/or could have a structure to increase the friction between the tongue element and the locking device when the locking device is turned.

According to another aspect of the present disclosure the tongue element is a cylindrical segment. The tongue element being a cylindrical segment means that the side of the tongue element that is adapted to be in contact with the locking device is generally flat, i.e., it could still have some structure.

According to yet another aspect of the present disclosure the recess contacting side of the tongue element has at least one protrusion. This increases the contact area between the object with the recess and the tongue element and thus the friction and the holding force.

Alternatively, the protrusion or protrusions is instead an elongate ridge or elongate ridges, respectively. The reason for a ridge or ridges being also to increase the contact area between the object with the recess and the tongue element and thus the friction and the holding force.

A further alternative of this is having the elongate ridge arranged in a plane parallel to the plane of the recess opening when inserted into the recess. As well as increasing the contact area between the object with the recess and the tongue element and thus the friction and holding force, it also specifically increases the strength against the mounting bracket being pulled out.

According to a further aspect of the present disclosure the other side of the tongue element has a groove along the length of the tongue element. Upon turning the locking device, the groove will help the user to find the correct locking position since there will be a tactile response when the locking device is turned such that a part of it enters the groove.

According to an alternative, the groove is centred on said side of the tongue element such that the locking device will have to be turned about 90 degrees to enter the locking position.

According to a further alternative, the other side of the tongue element has at least one ridge along the length of the tongue element. Instead of a groove or combined with a groove, a ridge can provide a similar tactile signal to the user when the locking device is turned passing the ridge. A further option is to have two ridges running parallel creating a groove between the ridges.

Similar to the solution with a groove described above, as an alternative, the ridge is centred on said side of the tongue element to indicate that the locking device has to be turned about 90 degrees to enter the locking position.

According to a further aspect of the present disclosure the mounting bracket comprises a ledge adjacent the tongue element and arranged to be in the same plane as the rotational plane of the lever of the locking device as a rotational stop to the lever. This has the function of limiting how far the handle can be turned which could also function as information to the user about when the correct locking position has been found.

According to yet a further aspect of the present disclosure the length of the circle sector being at least 10% of the circumference of the recess and less than 80% of the circumference of the recess, or at least 25% of the circumference of the recess and less than 50% of the circumference of the recess.

According to yet a further aspect the materials of the object with the recess and the locking device may be such that they allow for any or both of these to be compressed.

According to an optional aspect of the present disclosure, the length of the tongue element is less than four times the radius of the tongue element sector.

According to a further aspect of the present disclosure the bracket comprises two tongue elements. Two tongue elements that are locked in their corresponding recesses ensure that the mounting bracket is in the correct position.

Also provided is a furniture fitting assembly comprising a mounting bracket according to the above as well as a locking device also described above, wherein the assembly further comprises a panel with at least one cylindrical recess with a radius corresponding to the radius of circle sector of the tongue element on the recess contacting side.

According to one aspect of the furniture assembly, the length of the lever on the locking device is longer than two times the radius of the recess. Having it shorter, it might be difficult turning the locking device into the locking position.

According to a further aspect of the furniture assembly, the panel is a cover panel. It could for instance be a cover panel for a kitchen cupboard.

According to another aspect of the furniture assembly, the panel comprises a wood base core and the mounting bracket may comprise a polymer material, such as a thermoplastic material or a thermosetting material. In this way, the wood base of the panel in the recess may be compressed by the harder polymer material.

According to a further aspect of the furniture assembly, the tongue element may have a higher level of tensile strength than the cylinder of the locking device. The mounting bracket may be made in one piece with the tongue element. Thus, the locking device is the smaller of the two parts and may be cheaper as well as being easier to replace in case that would be necessary. The locking device, or more specifically, the cylinder may be more easily deformed compared to the tongue element of the mounting bracket.

According to yet another aspect of the furniture assembly, the tongue element is longer than the cylinder of the locking device. By having the tongue element reaching farther into the recess or rather, the locking device not reaching farther than the tongue element, the risk of the locking device pushing the tongue element from underneath such that it biases the tongue element out of the recess is minimized.

It should be emphasized that the term "comprises/comprising" when used in this specification is taken to specify the presence of stated features, integers, steps, or components but does not preclude the presence or addition of one or more other features, integers, steps, components, or groups thereof.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects, features, and advantages of which embodiments of the invention are capable of will be apparent and elucidated from the following description of embodiments of the present invention, reference being made to the accompanying drawings, in which.

DETAILED DESCRIPTION OF EXAMPLE EMBODIMENTS

Figure 1:
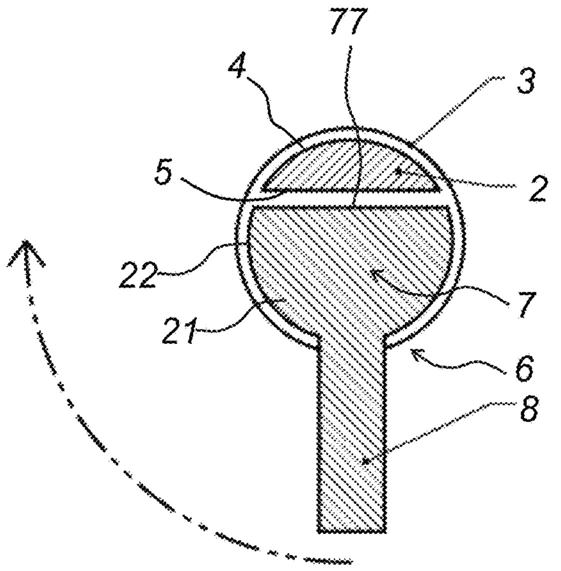
FIG. 1 shows the working principle of the mounting bracket according to an embodiment of the present disclosure in a mounting position.

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of embodiments of the invention to those skilled in the art. The terminology used in the detailed description of the embodiments illustrated in the accompanying drawings is not intended to be limiting of the invention. In the drawings and in the description, like numbers refer to like elements.

As used herein, the term "about" means ±10% of the noted value. By way of example only, a rotation of "about 90 degrees" could include from 81 degrees to 99 degrees.

The following description focuses on embodiments of the present invention applicable to a mounting bracket that is being used with a panel and in particular to a furniture panel. However, it will be appreciated that the disclosure is not limited to this application but may be applied to other than furniture, for instance, floorboards being attached to a foundation.

Figure 2:
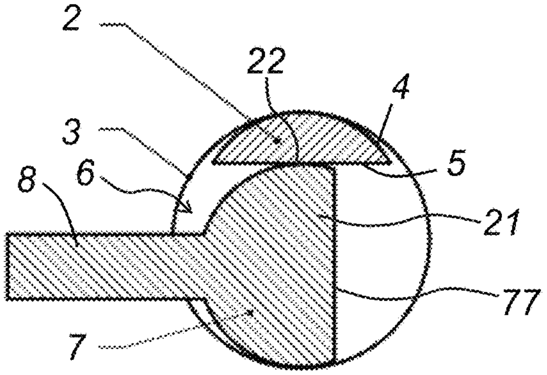
FIG. 2 shows the working principle of the mounting bracket according to an embodiment of the present disclosure in a locking position.

In FIGS. 1 and 2 the working principle of an embodiment of the invention is shown. FIG. 1 shows a locking device 6 with its cylinder 7 inserted in a cylindrical recess 3 next to the tongue element 2 of a mounting bracket in a so-called mounting position.

In FIG. 2, the locking device 6 has been turned 90 degrees using the lever 8 into a locking position. The cylinder 7 is an eccentric cylinder 7 comprising a top base 21 and a bottom base 23 and a locking surface 22 connecting the top and bottom base.

The cylinder 7 may include a face 77 which may be substantially planar. The face 77 may be configured as if a perfect cylinder were cleaved. For example, a maximum distance from an opposite wall to the face may be 55-90%, or 60-80% of the diameter of a perfect cylinder. In another embodiment, a maximum distance from an opposite wall to the face may be 55-90%, or 60-80% of a maximum diameter of the cylinder 7. The cylinder may also have an ovular cross-sectional shape.

The cylinder 7 is further configured to act as a cam when the cylinder 7 is turned about its axis in the recess 3 using the lever 8 such that the cylinder 7 is turned to the locking position in which at least a part of the locking surface pushes the tongue element 2 such that said recess contacting side 4 of the tongue element 2 is in a pressing fit against the side of the recess 3.

The cross section of the tongue element 2 on the recess contacting side may be a circle sector with a radius corresponding essentially to a radius of the cylindrical recess 3.

The radius of the circle sector may be the same as or within 10% smaller than the radius of the cylindrical recess.

The length of the circle sector may be at least 10% of the circumference of the recess 3 and less than 80% of the circumference of the recess 3.

The length 31 of the tongue element 2, see FIGS. 16, 18, 20, 22, may be less than four times the radius of the tongue element circle sector.

The amount of rotation of the locking device 6 may be any amount sufficient to cause the pressing fit, such as 60-120 degrees, or 75-105 degrees, or about 90 degrees.

Figure 3:
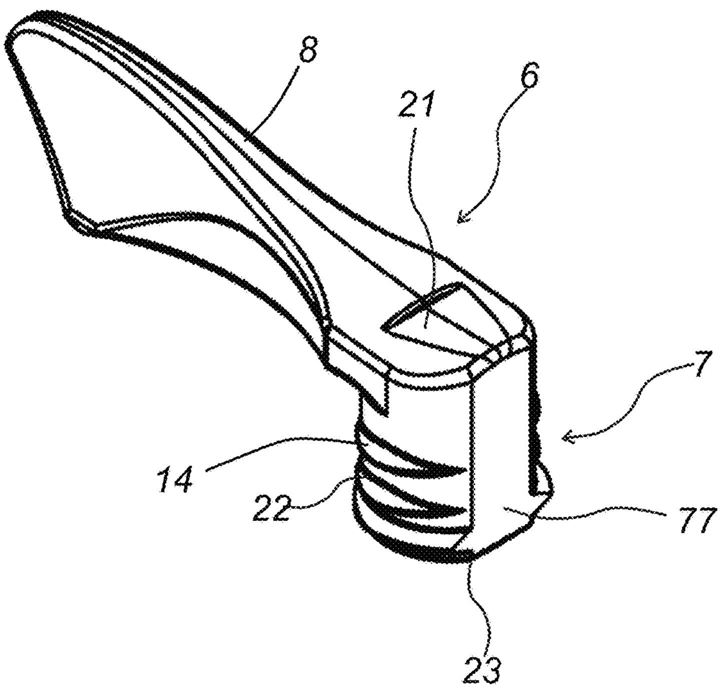
FIG. 3 is a perspective view of a locking device.

FIG. 3 is a perspective view of a locking device 6 embodiment. This embodiment of the locking device 6 has elongate protrusions 14 or ridges. The protrusions 14 help to increase the contact surface between the cylinder 7 and the recess 2 when the locking device 6 is in the locking position (see FIG. 2).

The protrusions 14 may extend around the cylinder 7 from one edge of the face 77 to the other edge of the face 77, excluding the face. In an embodiment, the protrusions may extend only on two sides of the cylinder 7. In an embodiment, the protrusions may extend only on one side of the cylinder 7.

The locking device 6 and the tongue element 2 may comprise a polymer material, such as a thermoplastic or thermosetting material. The tongue element 2 may have a higher level of tensile strength than the cylinder 7 of the locking device 6.

The polymer material, such as a thermoplastic material of the tongue element may be reinforced by a reinforcing material to obtain the higher level of strength.

The reinforcing material may be one or more of glass fibres, chalk, or carbon fibre.

The cylinder 7 and/or the protrusions 14 may be configured to be elastically and/or plastically deformed when the cylinder is turned to the locking position.

Figure 4:
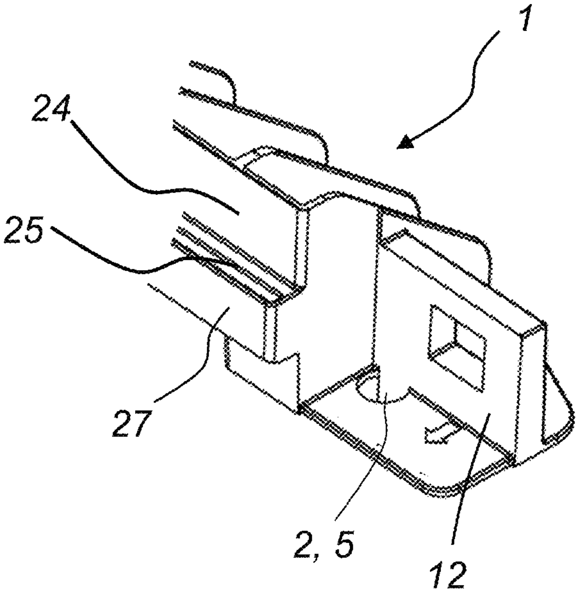
FIG. 4 is a top perspective view of a part of a mounting bracket according to the present disclosure.

FIG. 4 is a partial perspective view of an embodiment of a mounting bracket 1 with the tongue element 2 being visible in a hole in the mounting bracket 1. The other side 5 of the tongue element 2 is what is seen of the tongue element 2. The mounting bracket 1 also has a ledge 12 adjacent the tongue element 2 that is arranged to be in a plane parallel to the rotational axis of the lever of the locking device as a rotational stop to the lever.

The mounting bracket 1 may comprise a mounting surface 24 which may be configured to cooperate with a surface of another object.

The mounting bracket 1 may comprise a protruding part 27 which may be configured to be inserted into a groove of another object.

The protruding part may comprise a flexible tongue 25 which is configured to cooperate with a tongue groove in a groove of another object.

Figure 5:
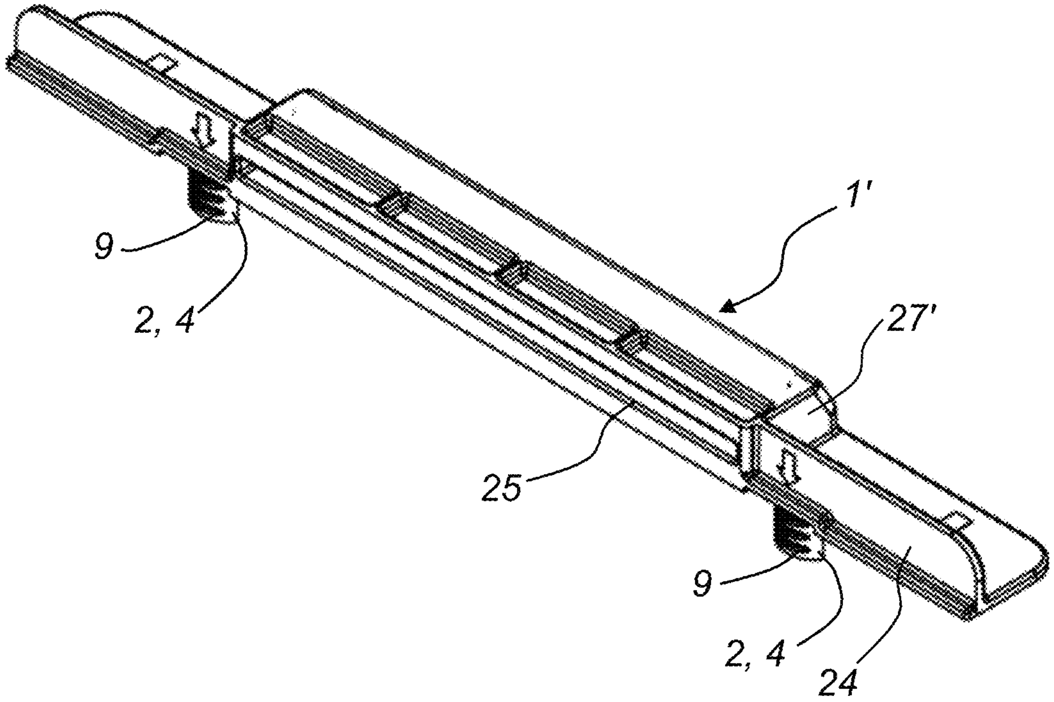
FIG. 5 is a top perspective view of a mounting bracket according to the present disclosure.

In FIG. 5 another embodiment of the mounting bracket 1' is shown in perspective. Two tongue elements 2 are shown on the mounting bracket 2 with the recess contacting side 4 visible for both tongue elements 2. On the recess contacting side 4 are also elongate protrusions 9 shown.

The mounting bracket 1' may comprise a protruding part 27 which may be configured to be inserted into a groove of another object.

The protruding part may comprise a flexible tongue 25 which is configured to cooperate with a tongue groove in a groove of another object.

FIGS. 6 to 9 show in sequence how an embodiment of the mounting bracket 1' according to the present disclosure is assembled on an object, which may be a panel 13', which comprises a cylindrical recess 3.

Figure 6:
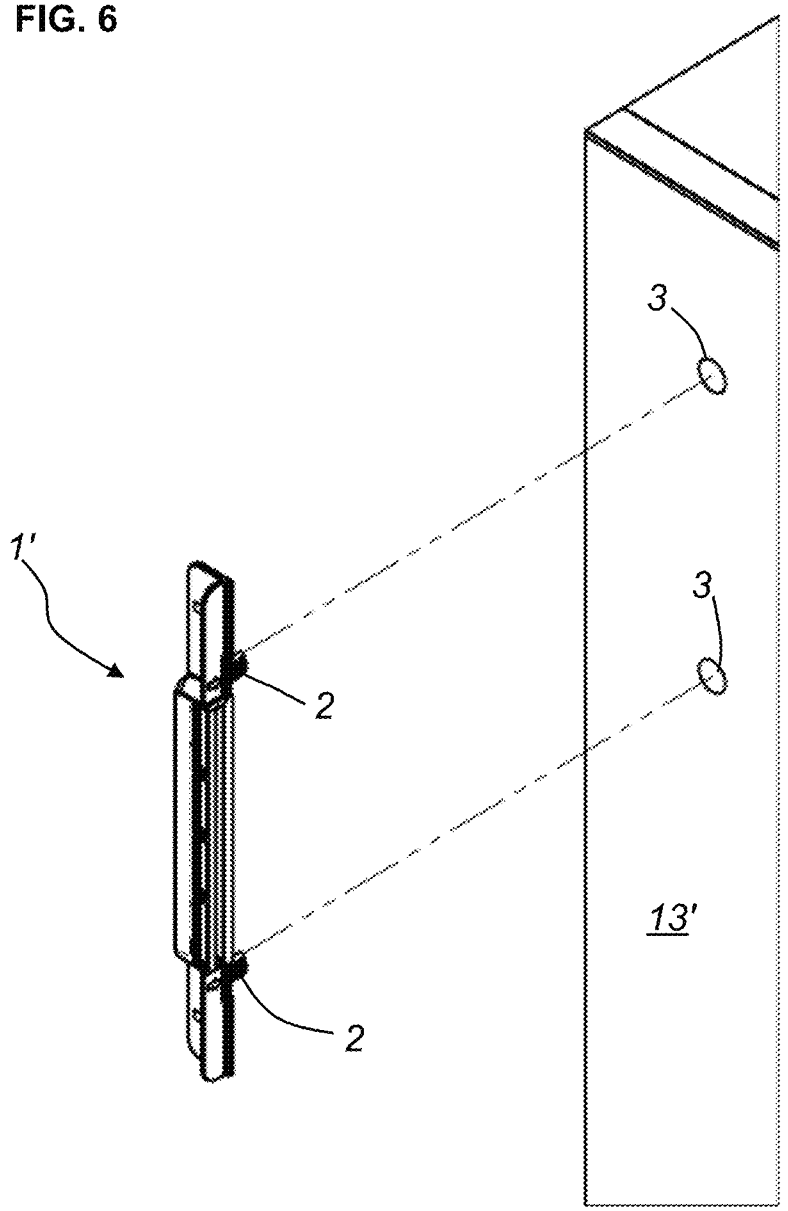
FIGS. 6 to 9 show in sequence how a mounting bracket according to the present disclosure is mounted on a panel.

FIG. 6 shows the mounting bracket 1' with its two tongue elements 2 aimed at the cylindrical recesses 3 of a panel 13. The tongue elements 2 are inserted in the recesses 3.

Figure 7:
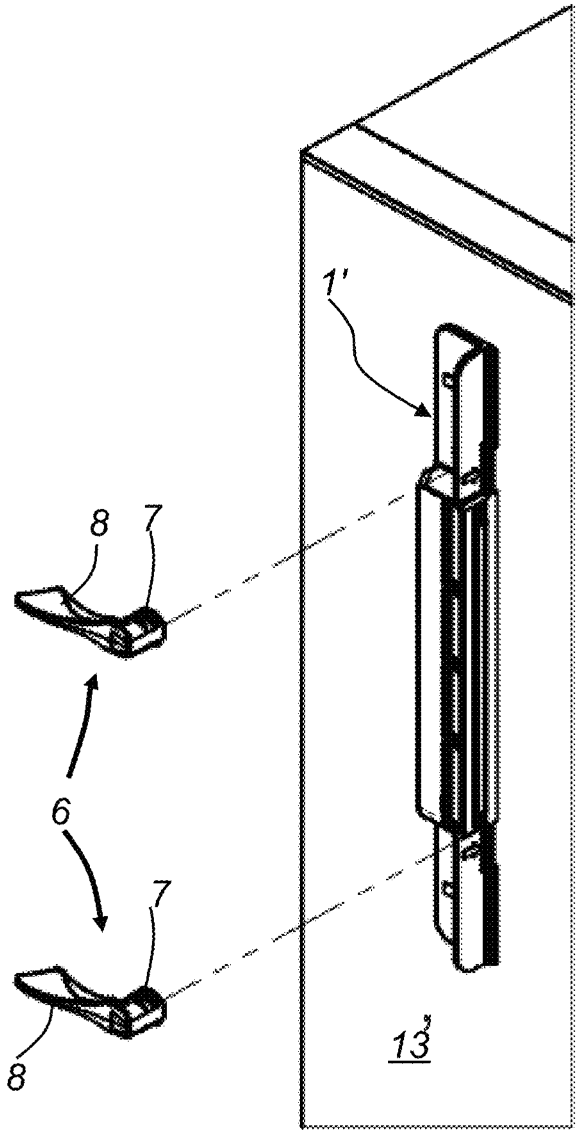

FIG. 7 shows when the mounting bracket 1' is arranged on the panel 13'. Next step is to insert a locking device 6 for each of the recesses with a tongue element.

Figure 8:
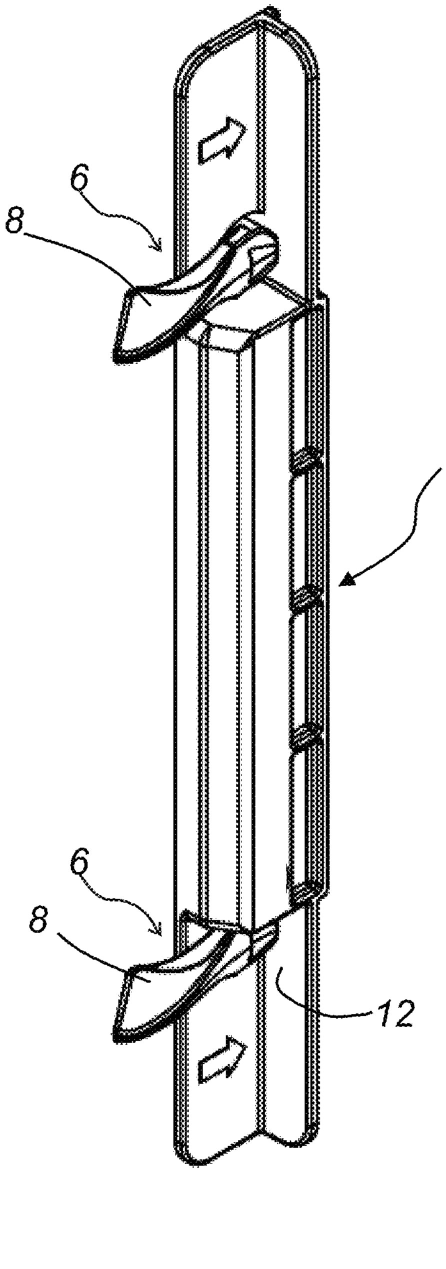
Figure 9:
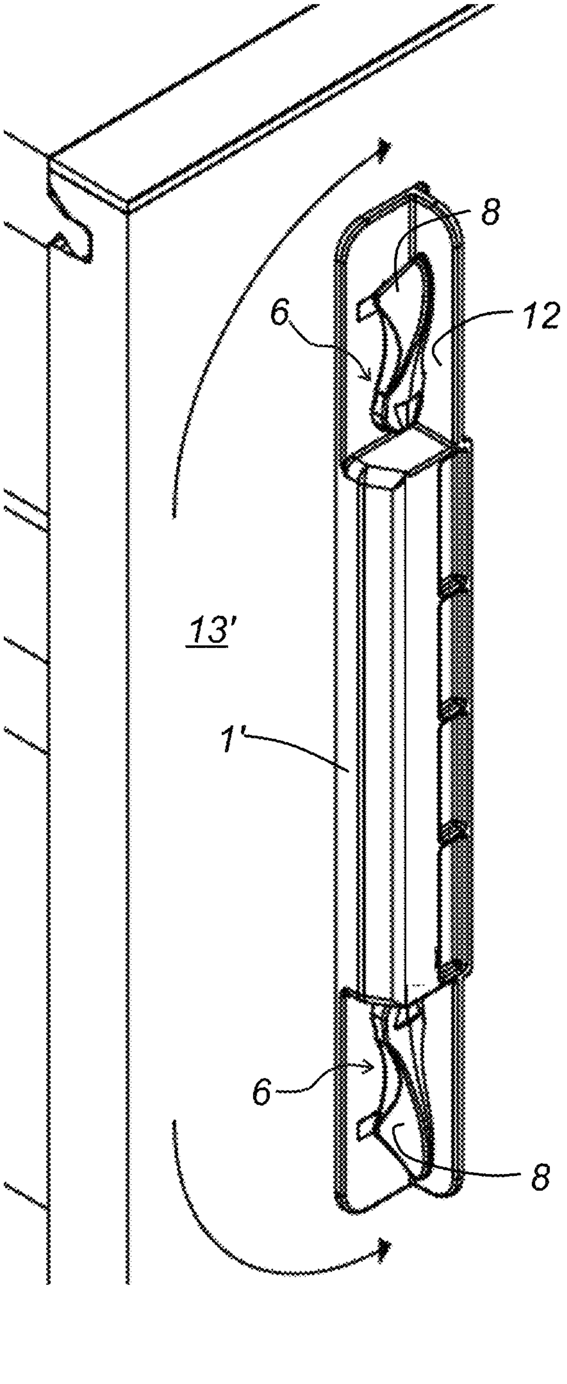

Turning now to FIG. 8, the locking devices 6 have been inserted in a mounting position. In FIG. 9, the locking devices 6 have been turned using the levers 8 until they reach a stopping ledge 12 and thus have reached a locking position.

Figure 10:
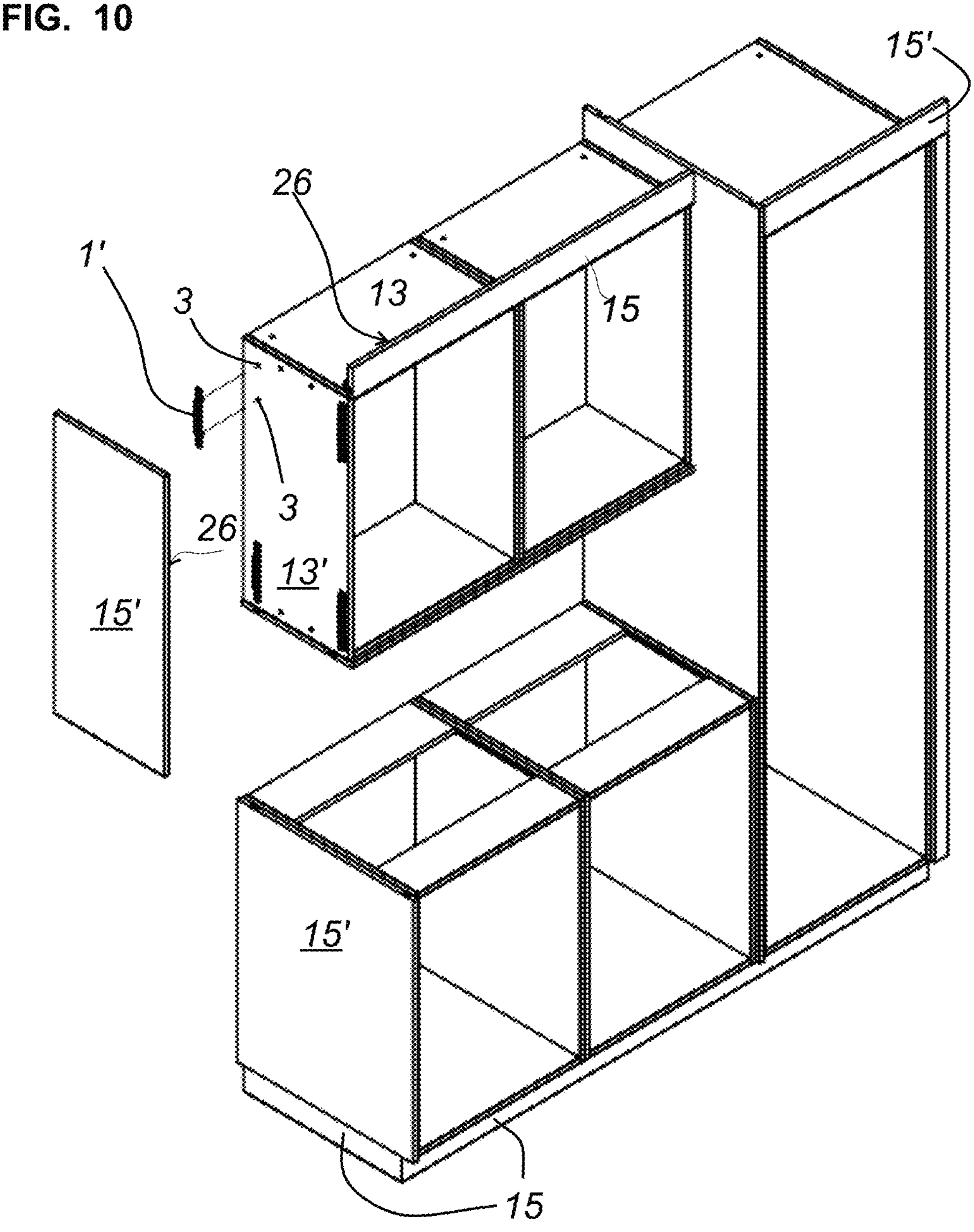
FIG. 10 depicts an example of where the mounting bracket according to the present disclosure can be used.

In FIG. 10, a kitchen is being assembled with the help of mounting brackets 1, 1' according to the present disclosure. After the brackets 1 have been attached to an object, which may by the panel 13, 13', another object, which may be a cover panel 15, 15', can be arranged on the mounting brackets 1.

A surface 26 of the another object 15 may cooperate with a mounting surface 24, see FIG. 4, of the mounting brackets 1.

The another object 15, 15' may be attached to the mounting brackets 1, 1' by a traditional fastening device, such as a screw, or more preferably by a device which does not require regular tools, such as a snap in locking device which comprises a flexible tongue 25.

Figure 11:
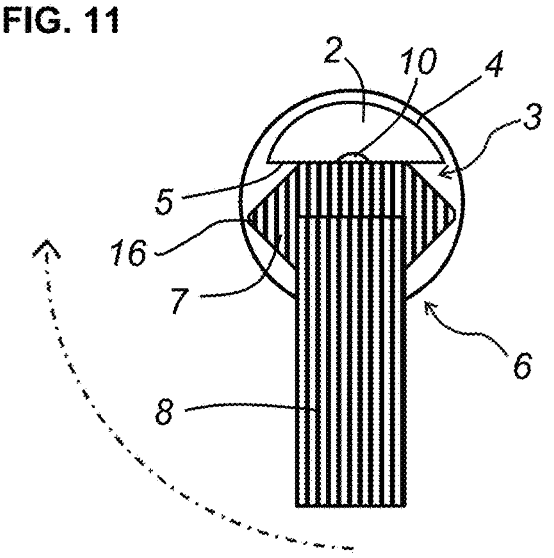
FIGS. 11 to 12 are a depiction of the locking principle according to an alternative embodiment of the present disclosure.
Figure 12:
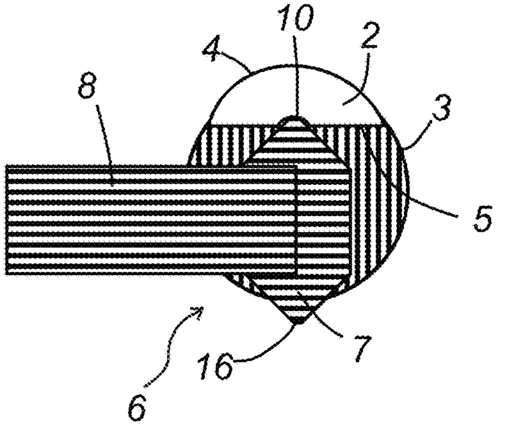

In FIGS. 11 to 12, the working principle of an embodiment of the invention is shown with an alternative embodiment of the tongue element 2. FIG. 11 shows a locking device 6 with its cylinder 7 inserted in a cylindrical recess 3 next to the tongue element 2 of a mounting bracket in a so-called mounting position. What is added compared to the embodiment shown in FIG. 1 is the groove 10.

Thus, the mounting bracket with its tongue element 2 is arranged in a recess such that the underside of the mounting bracket abuts the panel with the recess 3 and the tongue element 2 is fully inserted in the recess. Next, the locking device 6 is arranged with its cylindrical part 7 in the recess 3 and pushed into the recess 3 until it is fully inserted, as shown in FIG. 11. The next step is to turn the locking device 6 as indicated by the arrow in FIG. 11. The locking devices 6 may also be turned in the opposite direction depending on what is more convenient for the user. Alternatively, the locking devices could also made to allow for rotation in only one direction such that you have specific locking devices for a turning them right or left, respectively.

The turning of the locking device 6 can be seen by comparing the position of the tongue element 2 relative the recess 3 in FIGS. 11 and 12, due to the cylinder 7 of the locking device 6 being eccentric, the tongue element 2 comes to a pressing fit against the recess 3, as seen in FIG. 12.

In FIG. 12, the locking device 6 has been turned 90 degrees using the lever 8 into a locking position. The cylinder 7 is an eccentric cylinder 7 comprising a top and bottom base and a locking surface connecting the top and bottom base. The cylinder 7 is further configured to act as a cam when the cylinder 7 is turned about its axis in the recess 3 using the lever 8 such that the cylinder 7 is turned to the locking position in which a part of the locking surface pushes the tongue element 2 such that said recess contacting side 4 of the tongue element 2 is in a pressing fit against the side of the recess 3.

The embodiment of the locking device 6 shown in FIGS. 11 and 12 has a shape which comprise edges 16 which are configured to fit in the groove 10 of the tongue element 2. The groove 10 serves at least two purposes, wherein one is the obvious of indicating to the user when the locking device 6 has reached the locking position. Another purpose or advantage may be that the locking device 6 in the locking position is biased to stay in the locking position, i.e., there is an additional resistance against the locking device 6 moving towards the mounting position.

Figure 13:
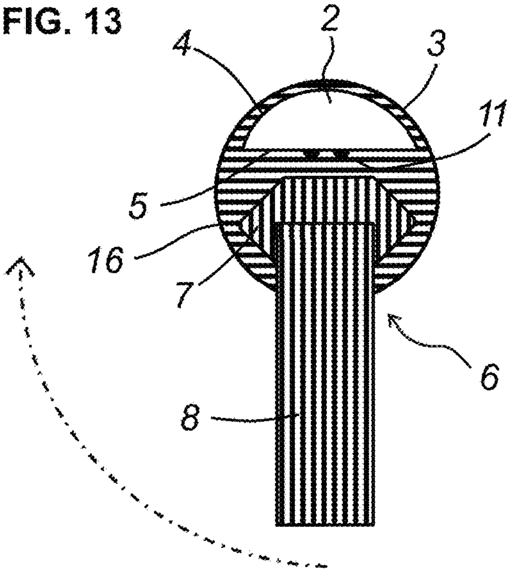
FIGS. 13 to 14 are a depiction of the locking principle according to yet an alternative embodiment of the present disclosure.
Figure 14:
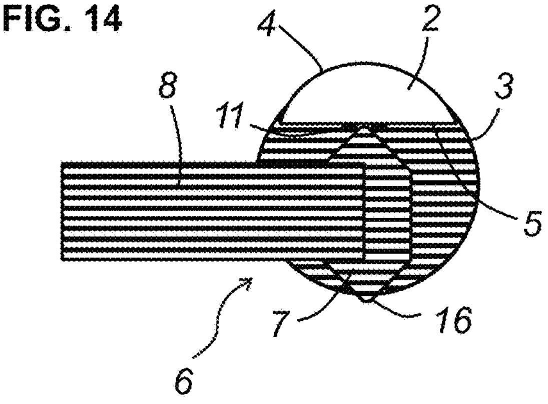

In FIGS. 13 to 14 the working principle of an embodiment of the invention is shown with yet an alternative embodiment of the tongue element 2. FIG. 13 shows a locking device 6 with its cylinder 7 inserted in a cylindrical recess 3 next to the tongue element 2 of a mounting bracket in a so-called mounting position. What is added compared to the embodiment shown in FIG. 1 are two parallel ridges 11.

Figure 14A:
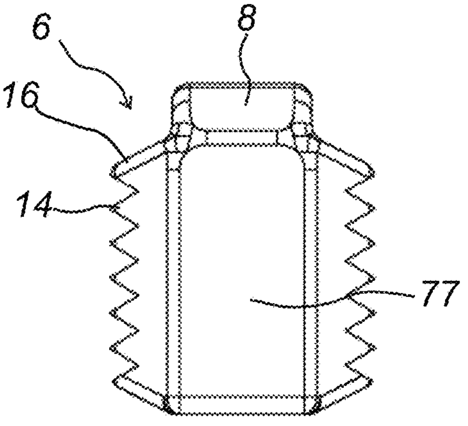
FIG. 14A is a side view of a locking device.

FIG. 14A shows a side view of an embodiment of the locking device 6 shown in FIGS. 11-14. The edge 16 of the locking device may comprise protrusions 14. The cylinder 7 may comprise a face 77 which may extend from the edge 16 to another opposite edge 16'. In an embodiment, the cylinder 7 comprises only one edge 16 (not shown).

Figure 14B:
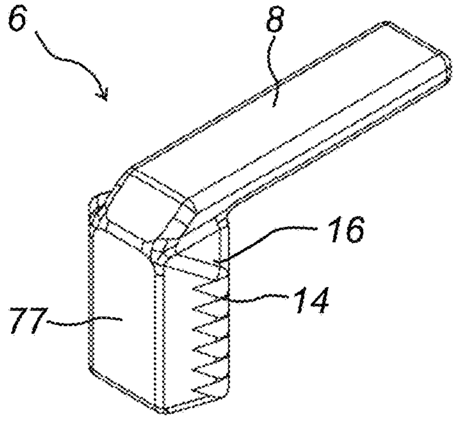
FIG. 14B is a perspective view of a locking device.

FIG. 14B shows a perspective view the embodiment of the locking device 6 shown in FIG. 14A.

Thus, the mounting bracket with its tongue element 2 is arranged in a recess such that the underside of the mounting bracket abuts the panel with the recess 3 and the tongue element 2 is fully inserted in the recess. Next, the locking device 6 is arranged with its cylindrical part 7 in the recess 3 and pushed into the recess 3 until it is fully inserted, as shown in FIG. 13. The next step is to turn the locking device 6 as indicated by the arrow in FIG. 13. The locking devices 6 may also be turned in the opposite direction depending on what is more convenient for the user. Alternatively, the locking devices could also made to allow for rotation in only one direction such that you have specific locking devices for a turning them right or left, respectively.

The turning of the locking device 6 is the next step and as can be seen comparing the position of the tongue element 2 relative the recess 3 in FIGS. 13 and 14, due to the cylinder 7 of the locking device 6 being eccentric, the tongue element 2 comes to a pressing fit against the recess 3, as seen in FIG. 14.

In FIG. 14, the locking device 6 has been turned 90 degrees using the lever 8 into a locking position. The cylinder 7 is an eccentric cylinder 7 comprising a top and bottom base and a locking surface connecting the top and bottom base. The cylinder 7 is further configured to act as a cam when the cylinder 7 is turned about its axis in the recess 3 using the lever 8 such that the cylinder 7 is turned to the locking position in which a part of the locking surface pushes the tongue element 2 such that said recess contacting side 4 of the tongue element 2 is in a pressing fit against the side of the recess 3.

The locking device 6 shown has a shape which comprises edges 16 that are adapted to fit between the two parallel ridges 11 of the tongue element 2. The ridges 11 serves at least two purposes wherein one is the obvious of indicating to the user when the locking device 6 has reached the locking position. Another purpose or advantage may be that the locking device 6 in the locking position is biased to stay in the locking position, i.e., there is an additional resistance against the locking device 6 moving towards the mounting position. As an alternative, only one ridge 11 could be centred on the side 5 such that the lever 8 is rotated until the edge 16 of the locking device cylinder 7 has passed the ridge.

Figure 15:
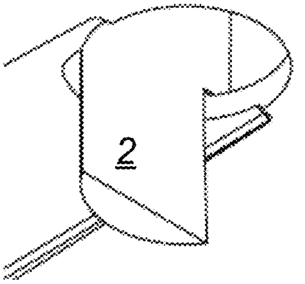
FIGS. 15 to 16 show an alternative embodiment of the present disclosure.
Figure 16:
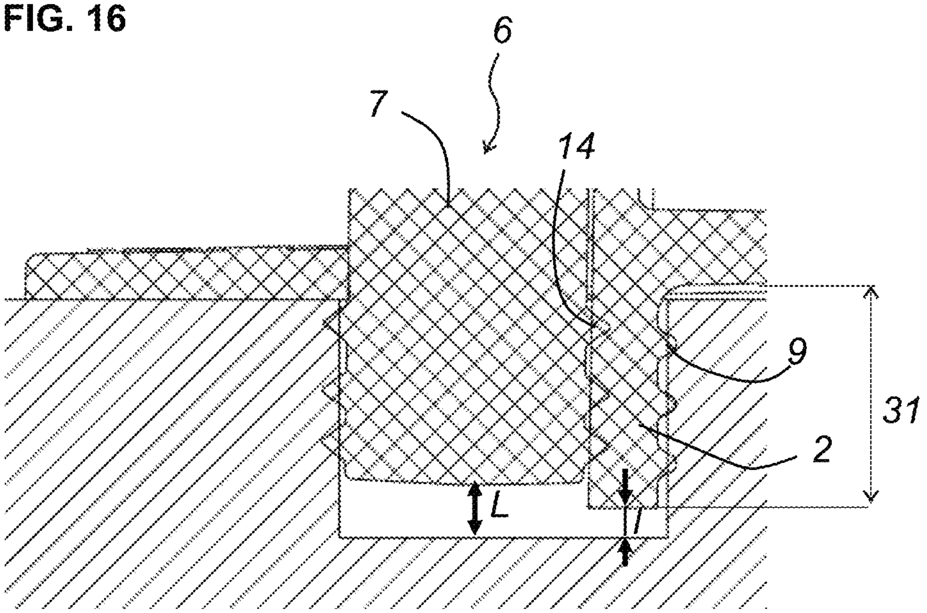

Turning to FIGS. 15 and 16, a mounting bracket with tongue element 2 having a flat side towards the locking device 6 is shown. Only the cylinder 7 of the locking device is shown and in the locking position. The ridges 14 of the cylinder 7 is partially pressed into the recess and the flat side of the tongue element 2. The tongue element further also displays ridges 9 that are pressed into the recess side.

Figure 17:
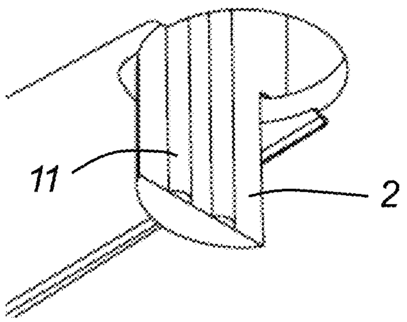
FIGS. 17 to 18 show a further alternative embodiment of the present disclosure.
Figure 18:
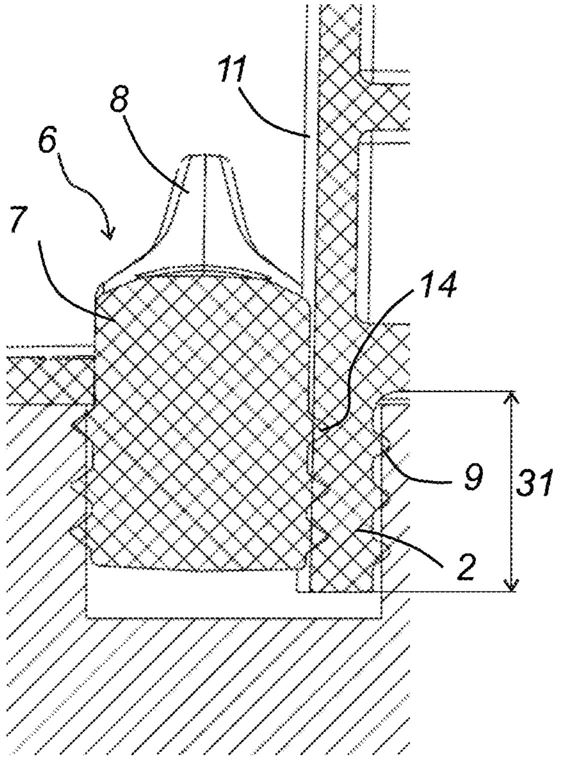

In FIGS. 17 and 18 an alternative is shown with the tongue element 2 having two parallel ridges 11 on its “flat” side. Upon turning the locking device 6 to the locking position shown in FIG. 18, the ridges 14 of the eccentric cylinder 7 first needs to pass one of the ridges 11 before it reaches a correct locking position. The user turning the locking device 6 with the handle 8 will have a tactile feedback when the locking device reaches the correct locking position. The locking device 6 is in the locking position in FIG. 18.

Figure 19:
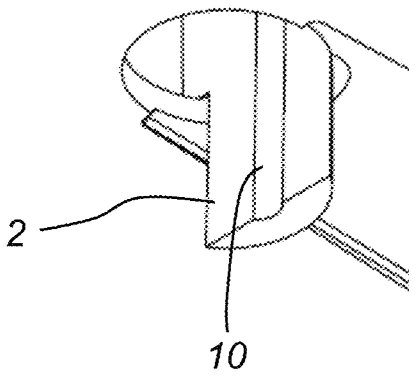
FIGS. 19 to 20 show yet a further alternative embodiment of the present disclosure.
Figure 20:
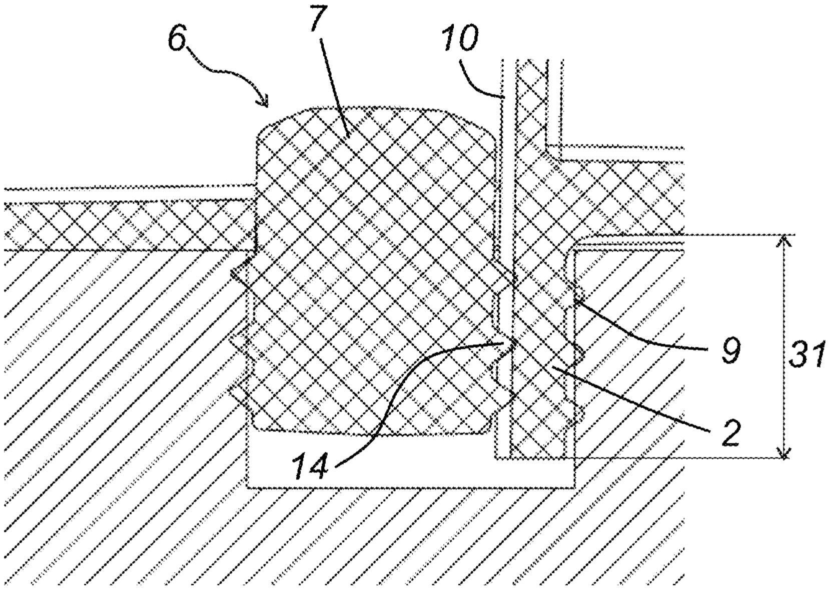

The embodiment shown in FIGS. 19 and 20 is similar in function to that of the embodiment shown in FIGS. 17 and 18 in that the user turning the locking device 6 will have a tactile feedback to know when the locking device 6 is in the locking position. However, instead of ridges, the “flat” side of the tongue element 2 has a groove 10 that will define the correct locking position of the locking device 6 relative the tongue element 2.

Figure 21:
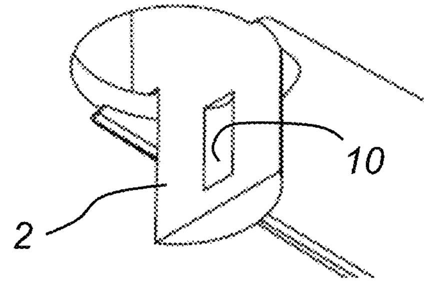
FIGS. 21 to 22 show another alternative embodiment of the present disclosure.
Figure 22:
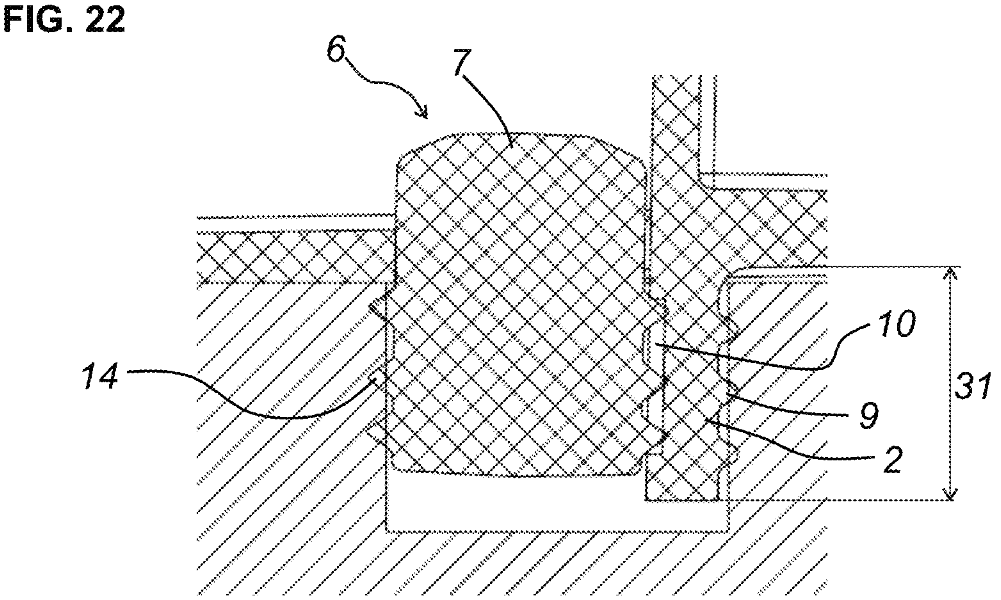

In FIGS. 21 and 22, the tongue element 2 has a limited groove 10 on its “flat” side, i.e., limited in the sense that the groove 10 does not extend along the entire length of the tongue element 2. An advantage with this embodiment may be that the locking position, as shown in FIG. 22, is controlled concerning the relative positions of the mounting bracket with the tongue element 2 and the locking device 6 when the locking device 6 has ridges 14 that correspond in a fitting way to the groove 10.

Further, as shown in FIG. 16 (18, 20, 22) the distance L between the bottom of the locking device 6 and the bottom of the recess is larger than the distance/between the end of the tongue element 2 and the bottom of the recess. A benefit of this relation, i.e., L>l, is that the risk of the locking device 6 biasing the tongue element 2 out of the recess is minimized or at least lower than would the relation be reversed.

Figure 23:
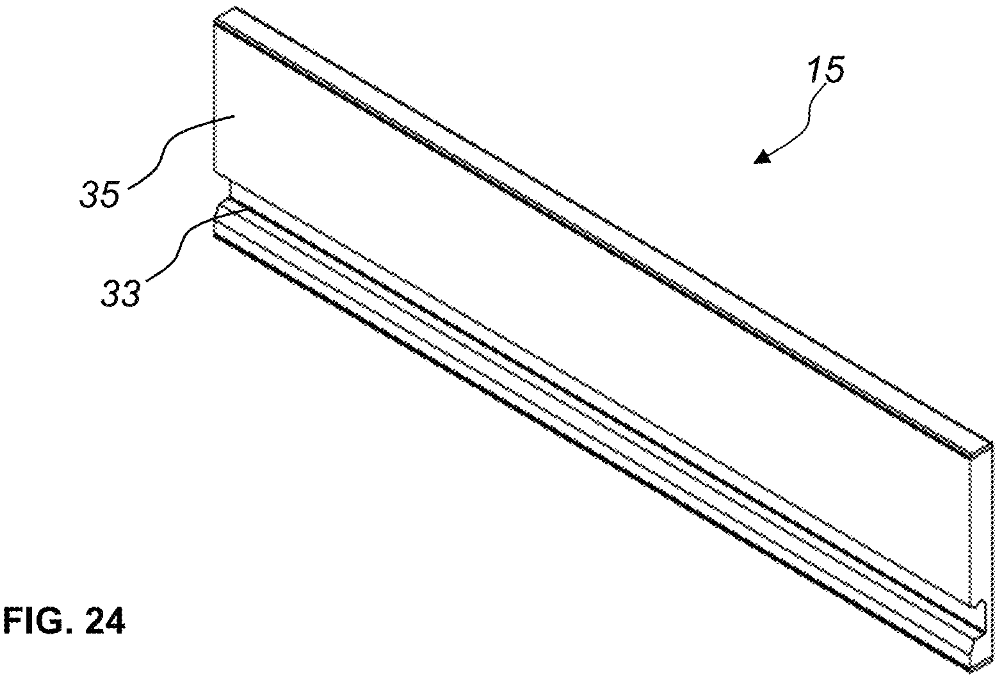
FIG. 23 shows an embodiment of the another object.

FIG. 23 shows an embodiment of the another object 15 which may be a panel. The another object 15 comprises a main object surface 35 which may comprise an object groove 33.

Figure 24:
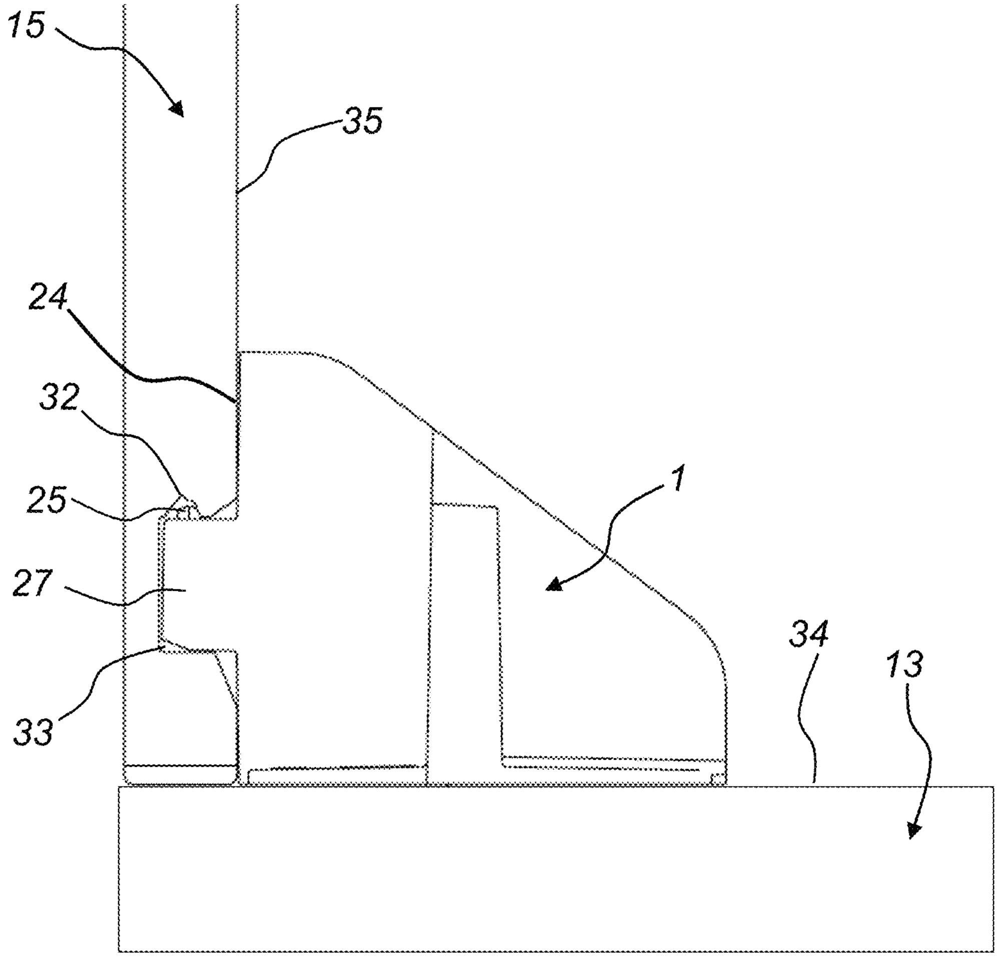
FIG. 24 shows a side view of an example comprising an embodiment of the mounting bracket connecting an embodiment of the object to an embodiment of the another object.

FIG. 24 shows a side view of an example comprising an embodiment of the mounting bracket 1 connecting an embodiment of the object 13 to an embodiment of the another object 15. The object 13 may comprise a main object surface 34. The object 13 and the another object 15 may be connected with the main object surface 35 of the another object 15 essentially perpendicular to the main object surface 33 of the object 13.

The mounting bracket 1 may comprise a protruding part 27 which may be configured to be inserted into the object groove 33 of the another object.

The protruding part 27 may comprise a flexible tongue 25 which is configured to cooperate with a tongue groove 32 in the object groove 33 of the another object 15.

The mounting bracket 1 may be an embodiment of the mounting bracket 1 shown in FIG. 4.

Figure 25:
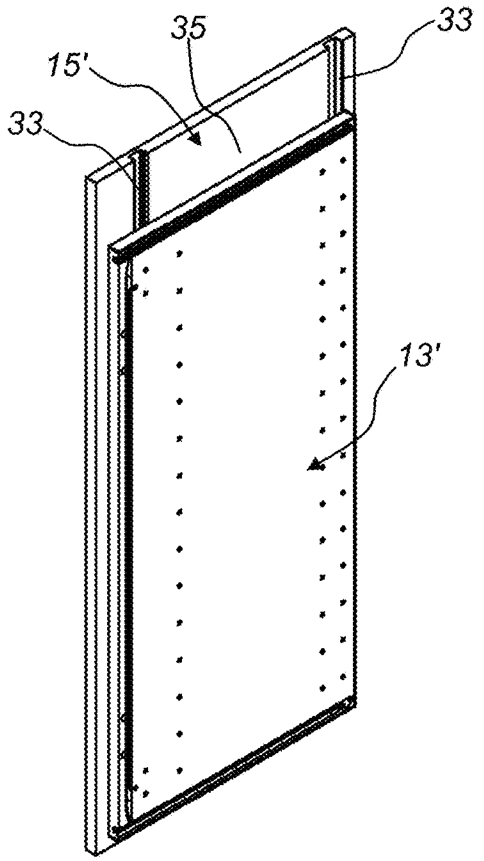
FIG. 25 shows a perspective view of an example comprising an embodiment of the mounting bracket connecting an embodiment of the object to an embodiment of the another object.

FIG. 25 shows a perspective view of an example comprising an embodiment of the mounting bracket 1' connecting an embodiment of the object to an embodiment of the another object.

Figure 26:
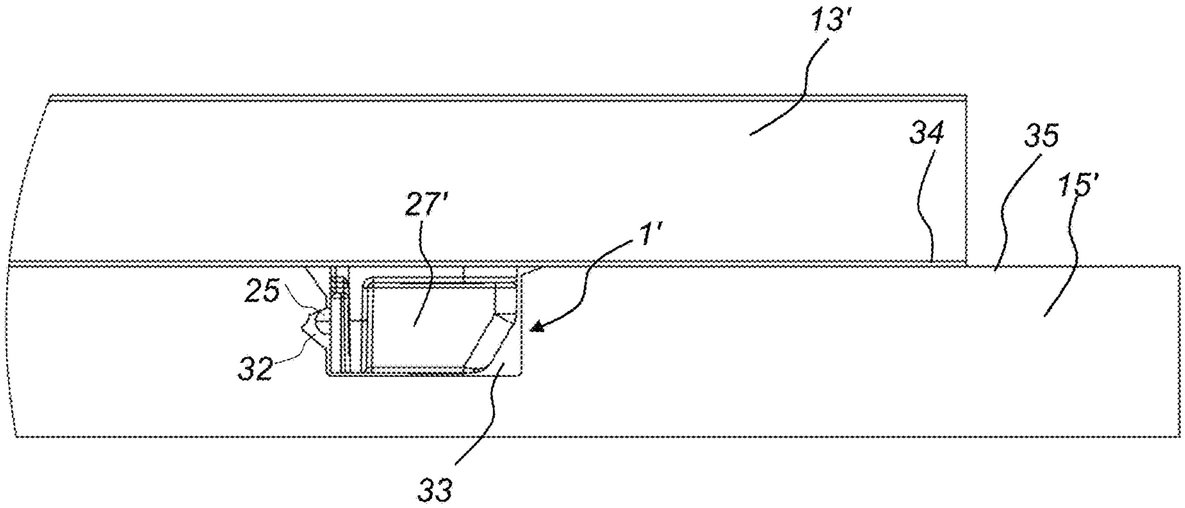
FIG. 26 shows an enlargement of a side view of the example in FIG. 25.

FIG. 26 shows an enlargement of a side view of the example in FIG. 25.

FIG. 26 shows an embodiment of the mounting bracket 1 connecting an embodiment of the object 13', to an embodiment of the another object 15'.

The object 13' may comprise a main object surface 34 and the another object 15' may comprise a main object surface 35.

The object 13' and the another object 15' may be connected with the main object surface 35 of the another object 15' essentially parallel to the main object surface 34 of the object 13'.

The main object surface 35 of the another object 15' may be in contact with the main object surface 34 of the object 13'.

The mounting bracket 1' may comprise a protruding part 27 which may be configured to be inserted into the object groove 33 of the another object 15'.

The protruding part 27 may comprise a flexible tongue 25 which is configured to cooperate with a tongue groove 32 in the object groove 33 of the another object 15'.

The mounting bracket 1' may be an embodiment of the mounting bracket 1 shown in FIG. 5.

Further embodiments of the invention are described below:

1. A mounting bracket 1, 1' comprising a first mounting part which is configured to be connected to an object 13, 13', wherein the first mounting part comprises an elongate protruding tongue element 2 which is configured to be inserted in a cylindrical recess 3 in the object 3, 13', wherein the tongue element 2 comprises one recess contacting side 4, wherein a cross section of the tongue element 2 on the recess contacting side 4 is preferably a circle sector with a radius, which may correspond to a radius of the cylindrical recess 3, the other side 5 of the tongue element 2 is configured to engage with a locking device 6, wherein the locking device 6 comprises a cylinder 7 and a lever 8 connected to the cylinder 7, wherein the cylinder 7 is configured to be arranged in the recess 3 adjacent said tongue element 2, wherein the cylinder 7 being an eccentric cylinder 7 comprising a top base and a bottom base and a locking surface connecting the top and bottom base, wherein the cylinder 7 is configured to act as a cam when the cylinder 7 is turned about its axis in the recess 3 using the lever 8 such that the cylinder 7 is turned from a mounting position to a locking position in which at least a part of the locking surface pushes the tongue element 2 such that said recess contacting side 4 of the tongue element 2 is in a pressing fit against the side of the recess 3.

2. The mounting bracket 1, 1' as described in embodiment 1, wherein the tongue element 2 is a cylindrical segment.

3. The mounting bracket 1, 1' as described in embodiment 1 or 2, wherein the recess contacting side 4 of the tongue element 2 has at least one protrusion 9.

4. The mounting bracket 1, 1' as described in embodiment 3, wherein the protrusion 9 is an elongate ridge.

5. The mounting bracket 1, 1' as described in embodiment 4, wherein the elongate ridge 9 is arranged in a plane parallel to the plane of the recess opening when inserted into the recess 3.

6. The mounting bracket 1,1' as described in any of the embodiments 1-5, wherein the other side 5 of the tongue element 2 has a groove 10 along at least a part of the length of the tongue element 2.

7. The mounting bracket 1,1' as described in embodiment 6, wherein the groove 10 is centred on said side 5 of the tongue element 2.

8. The mounting bracket 1,1' as described in any of the embodiments 1-5, wherein the other side 5 of the tongue element 2 has at least one ridge 11 along at least a part of the length of the tongue element 2.

9. The mounting bracket 1,1' as described in any of the embodiments 1-8, further comprising a ledge 12 adjacent the tongue element 2 and arranged to be in the same plane as the rotational plane of the lever 8 of the locking device 6 as a rotational stop to the lever 8.

10. The mounting bracket 1,1' as described in any of the embodiments 1-9, wherein the length of the circle sector being at least 10% of the circumference of the recess 3 and less than 80% of the circumference of the recess 3.

11. The mounting bracket 1,1' as described in any of the embodiments 1-10, wherein the length of the tongue element 2 is less than four times the radius of the tongue element circle sector.

12. The mounting bracket 1, 1' as described in any of the embodiments 1-11, wherein the mounting bracket comprises a second mounting part which is configured to be connected to another object 15, 15'.

13. The mounting bracket 1, 1' as described in the embodiment 12, wherein the second mounting part comprises a mounting surface 24 which is configured to cooperate with a main object surface 35 surface of the another object 15.

14. The mounting bracket 1, 1' as described in the embodiment 12 or 13, wherein the second mounting part comprises a protruding part 27 which may be configured to be inserted into an object groove 33 in a main object surface 35 of the another object 15, 15'.

15. The mounting bracket 1, 1' as described in the embodiment 14, wherein the protruding part comprises a flexible tongue 25 which is configured to cooperate with a tongue groove 32 in the object groove 33 of the another object 15, 15'.

16. The mounting bracket 1, 1' as described in any of the embodiments 1-15, wherein the object 13, 13' comprises a main object surface 34 and the other object 15, 15' comprises a main object surface 35.

17. The mounting bracket 1 as described in the embodiment 16, wherein the mounting bracket 1 is configured to connect the object 13 to the object 15 with the main object surface 34 perpendicular to the main object surface 35.

18. The mounting bracket 1' as described in the embodiment 16, wherein the mounting bracket 1' is configured to connect the object 13' to the object 15' with the main object surface 34 parallel to the main object surface 35.

As used herein, the singular forms "a," "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of embodiments of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teaching of the present invention is/are used.

The indefinite articles "a" and "an," as used herein in the specification and in the claims, unless clearly indicated to the contrary, should be understood to mean "at least one."

The invention claimed is:

1. A mounting bracket configured for connecting two objects to one another, the mounting bracket comprising a first mounting part configured to be connected to one of the objects and a second mounting part configured to be connected to the other object, wherein at least one of the mounting parts comprises an elongate protruding tongue element configured to be inserted in a cylindrical recess in one of the objects, wherein the tongue element has one recess contacting side, wherein the recess contacting side of the tongue element comprises at least one protrusion which is configured to cooperate with the cylindrical recess, the other side of the tongue element being configured to engage with a locking device, wherein the locking device comprises a cylinder and a lever connected to the cylinder, the cylinder being configured to be arranged in the recess adjacent said tongue element, the cylinder being an eccentric cylinder comprising a top base and a bottom base and a locking surface connecting the top and bottom base, wherein the cylinder is configured to act as a cam when the cylinder is turned about an axis in the recess using the lever such that the cylinder is turned from a mounting position to a locking position in which at least a part of the locking surface pushes the tongue element such that said recess contacting side of the tongue element is in a pressing fit against the side of the recess.

2. The mounting bracket according to claim 1, wherein the tongue element is a cylindrical segment.

3. The mounting bracket according to claim 1, wherein a cross section of the tongue element on the recess contacting side is a circle sector with a radius corresponding to a radius of the cylindrical recess.

4. The mounting bracket according to claim 1, wherein the protrusion is an elongate ridge.

5. The mounting bracket according to claim 4, wherein the elongate ridge is arranged in a plane parallel to the plane of the recess opening when inserted into the recess.

6. The mounting bracket according to claim 1, wherein the other side of the tongue element has a groove along at least a part of a length of the tongue element.

7. The mounting bracket according to claim 6, wherein the groove is centered on said other side of the tongue element.

8. The mounting bracket according to claim 1, wherein the other side of the tongue element has at least one ridge along at least a part of a length of the tongue element.

9. The mounting bracket according to claim 1, further comprising a ledge adjacent the tongue element and arranged to be in a same plane as a rotational plane of the lever of the locking device, the ledge being configured as a rotational stop to the lever.

10. The mounting bracket according to claim 1, wherein a cross section of the tongue element on the recess contacting side is a circle sector, wherein a length of the circle sector is at least 10 percent of a circumference of the recess and less than 80 percent of the circumference of the recess.

11. The mounting bracket according to claim 1, wherein a cross section of the tongue element on the recess contacting side is a circle sector, wherein a length of the tongue element is less than four times a radius of the circle sector.

12. The mounting bracket according to claim 1, wherein a cross section of the tongue element on the recess contacting side comprises a rounded shape.

13. The mounting bracket according to claim 12, wherein the rounded shape matches the cylindrical recess.

14. A furniture fitting assembly comprising the mounting bracket according to claim 1 and a locking device, wherein a cross section of the tongue element on the recess contacting side is a circle sector, wherein the assembly further comprises a panel with at least one cylindrical recess with a radius corresponding to a radius of the circle sector.

15. The furniture fitting assembly according to claim 14, wherein a length of the lever on the locking device is longer than two times the radius of the recess.

16. The furniture fitting assembly according to claim 14, wherein the panel comprises a wood base core and the mounting bracket comprises a polymer material.

17. The furniture fitting assembly according to claim 14, wherein the tongue element has a higher level of tensile strength than the cylinder of the locking device.

18. The furniture fitting assembly according to claim 14, wherein the tongue element is longer than the cylinder of the locking device.

* * * * *